United States Patent [19]

Shyr et al.

[11] Patent Number: 5,599,042
[45] Date of Patent: Feb. 4, 1997

[54] SAFETY AIR CURTAIN FOR VEHICLES

[75] Inventors: Chorng R. Shyr; Ming C. Cheng, both of Chie An Hurlan, Taiwan

[73] Assignee: Chorng Rong Shyr, Furlan, Taiwan

[21] Appl. No.: 572,368

[22] Filed: Dec. 14, 1995

[51] Int. Cl.[6] ............................. B60R 21/16; B60R 21/06
[52] U.S. Cl. .......................... 280/730.1; 280/749
[58] Field of Search ................................. 280/730.1, 749

[56] References Cited

U.S. PATENT DOCUMENTS

| | | | |
|---|---|---|---|
| 1,186,865 | 6/1916 | Uttz | 280/749 |
| 1,256,848 | 2/1918 | Uttz | 280/749 |
| 1,936,251 | 11/1933 | McCullough | 280/749 |
| 2,806,737 | 9/1957 | Maxwell | 280/730.1 |
| 5,112,081 | 5/1992 | Kesseru | 280/749 |

Primary Examiner—Kenneth R. Rice
Attorney, Agent, or Firm—Pro-Techtor International

[57] ABSTRACT

An inflatable safety air curtain device for vehicles includes an air curtain device mounted in the car in front and above the driver or the passengers and an infrared detecting device. The air curtain device consists of an inflatable air curtain furled on a shaft within a housing or compressed and folded up within the housing. The infrared detecting device is mounted at a farthest front end of the car and may, upon detecting any car or object within a critical range of the car, actuate an electromagnetic valve on the air curtain device to cause compressed air within the cylinder to flow into the air curtain to inflate the same so that the air curtain swells instantly downwardly to form a protective curtain for the driver or the passenger.

3 Claims, 6 Drawing Sheets

SAFETY AIR CURTAIN FOR VEHICLES

BACKGROUND OF THE INVENTION (a) Field of the Invention

The present invention relates generally to an air bag for vehicles, and more particularly to a curtain type air bag for not only cars and trucks but also mass transportation means such as buses, tourist buses and trains to provide effective protection against harm during crashing.

(b) Description of the Prior Art

With the fast development of technologies, the speed of vehicles has become incredibly high. There are also increased road accidents, which may be attributed to car speeding and the lack of proper safety devices.

Although there is available on the market air bags installed at the steering wheel, and they indeed provide safety for passengers to a certain extent. However, their protection effects are limited. In particular, the known air bags do not provide good protection against broken glass and do not offer sufficient protection for the driver or passenger's face and head.

SUMMARY OF THE INVENTION

Accordingly, a primary object of the present invention is to provide a safety air curtain device for vehicles to offer effective protection for the driver or passenger upon accidental crashing.

In order to achieve the above-mentioned object, the safety air curtain device for vehicles according to the present invention essentially comprises an automatic inflation device mounted in the car in front and above the head of the driver or passengers, the inflation device may be either rolled up on a shaft and placed inside a housing or folded up and placed inside the housing. An infrared detecting device is also disposed at a front end of the car to detect any cars or objects to which the car is approaching. The detecting device may, upon detecting any car or object within a critical range, actuate an electromagnetic valve on the inflation device so that high pressure compressed air from a compressed-air cylinder flows via a tubing into the air curtain to instantly inflate the air curtain furled on the shaft or folded within the housing to protect the driver or the passenger against possible harm from broken glass or parts upon accidental crashing.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
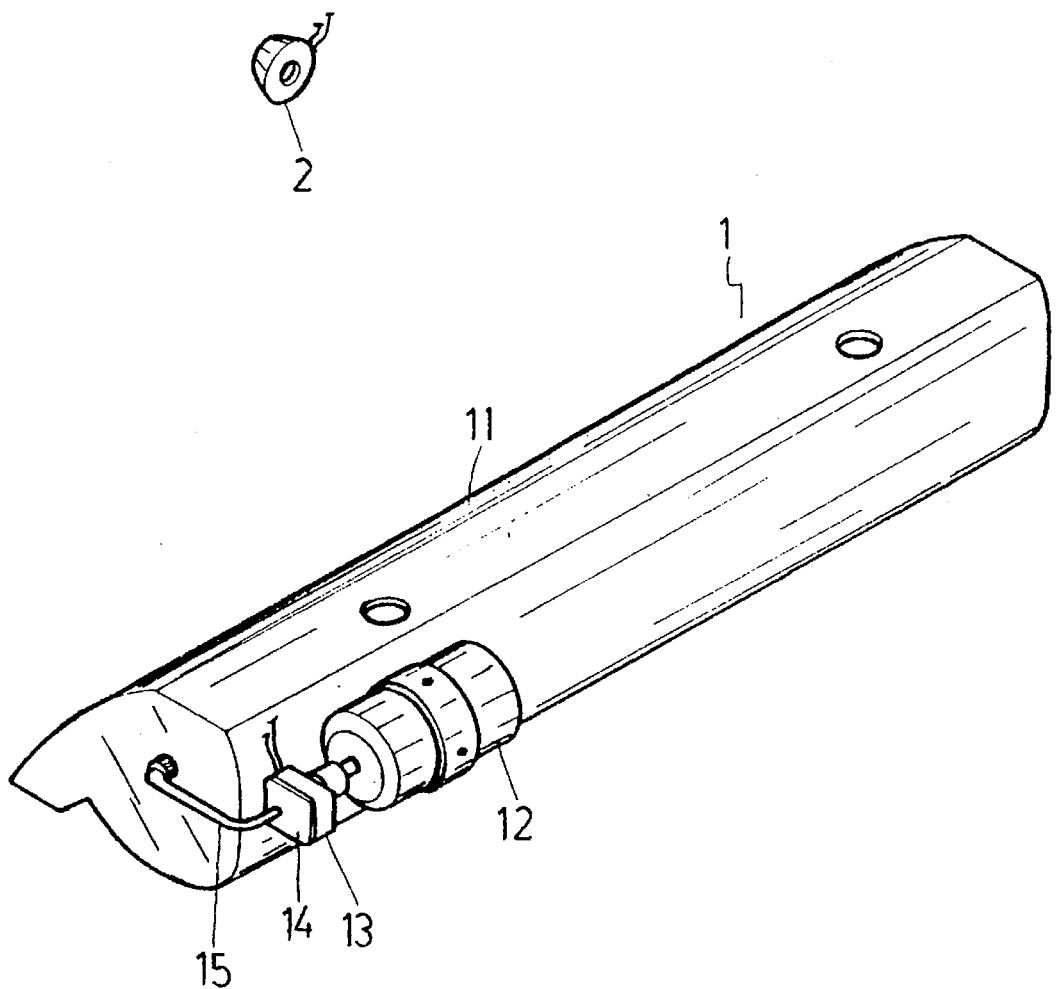
FIG. 1 is an elevational view of the air curtain device according to the present invention.

As shown in the drawings, the safety air curtain device according to the present invention essentially comprises an air curtain device 1 and an infrared detecting device 2. The air curtain device 1 consists of a housing 11 for accommodating an air curtain 17, and a compressed-air cylinder 12 for containing high pressure compressed air, an electromagnetic valve 13 and a circuit board 14 mounted at a rear side of the housing 11. The compressed-air cylinder 12 communicates via the electromagnetic valve 13 and a tubing 15 with the air curtain 17. The air curtain 17 may be configured to have a transparent window 171 at a suitable position so that it may not obstruct the vision of the driver. The air curtain device 1 is an automatic inflation device mounted in the car in front and above the head of the passenger or the driver. Besides, the air curtain 17 may be either rolled up and placed inside a housing or compressed and folded up within the housing.

Figure 2:
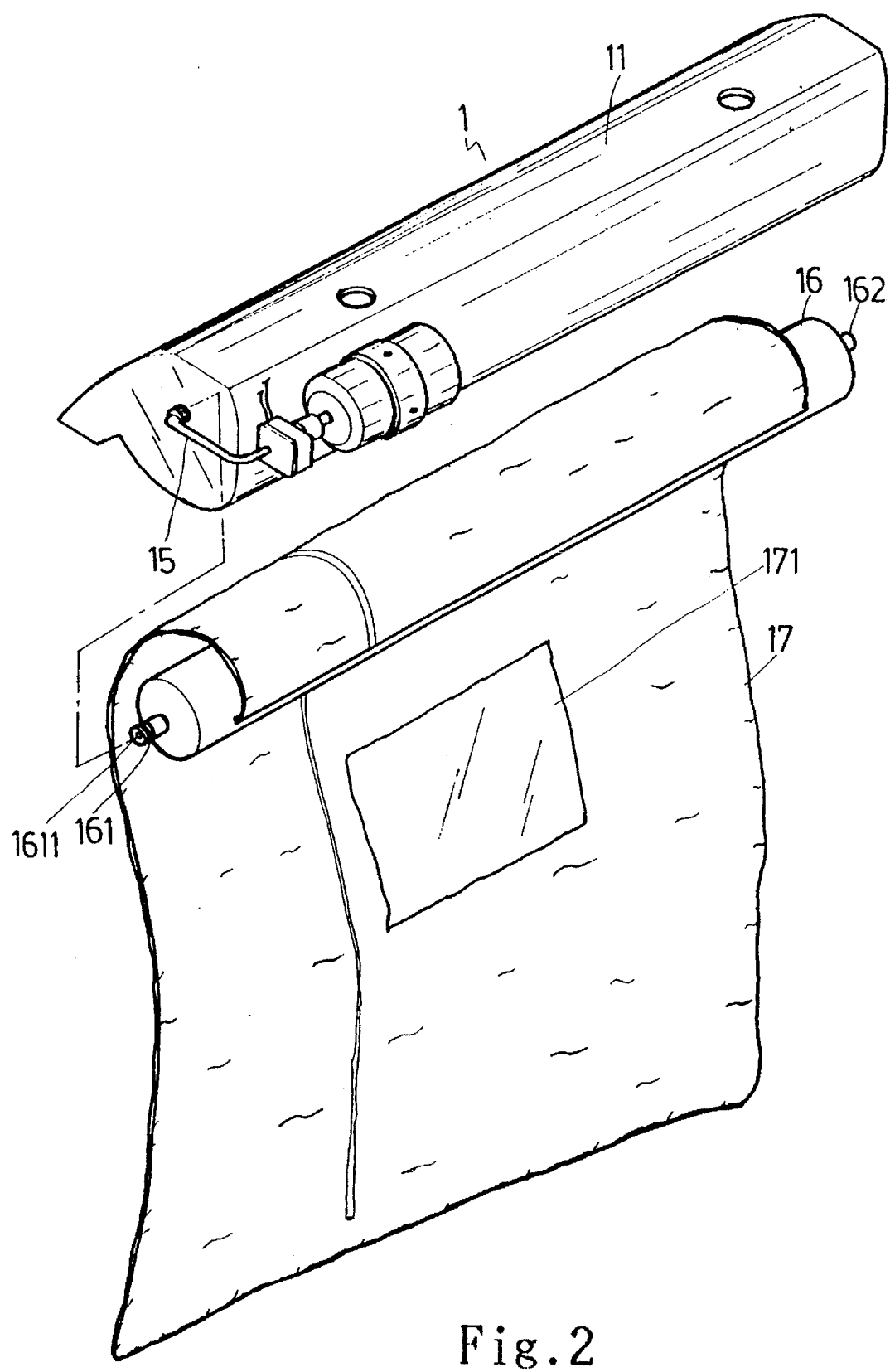
FIG. 2 is a partly exploded view of the air curtain device of the invention, showing an air curtain mounted to a shaft.
Figure 3:
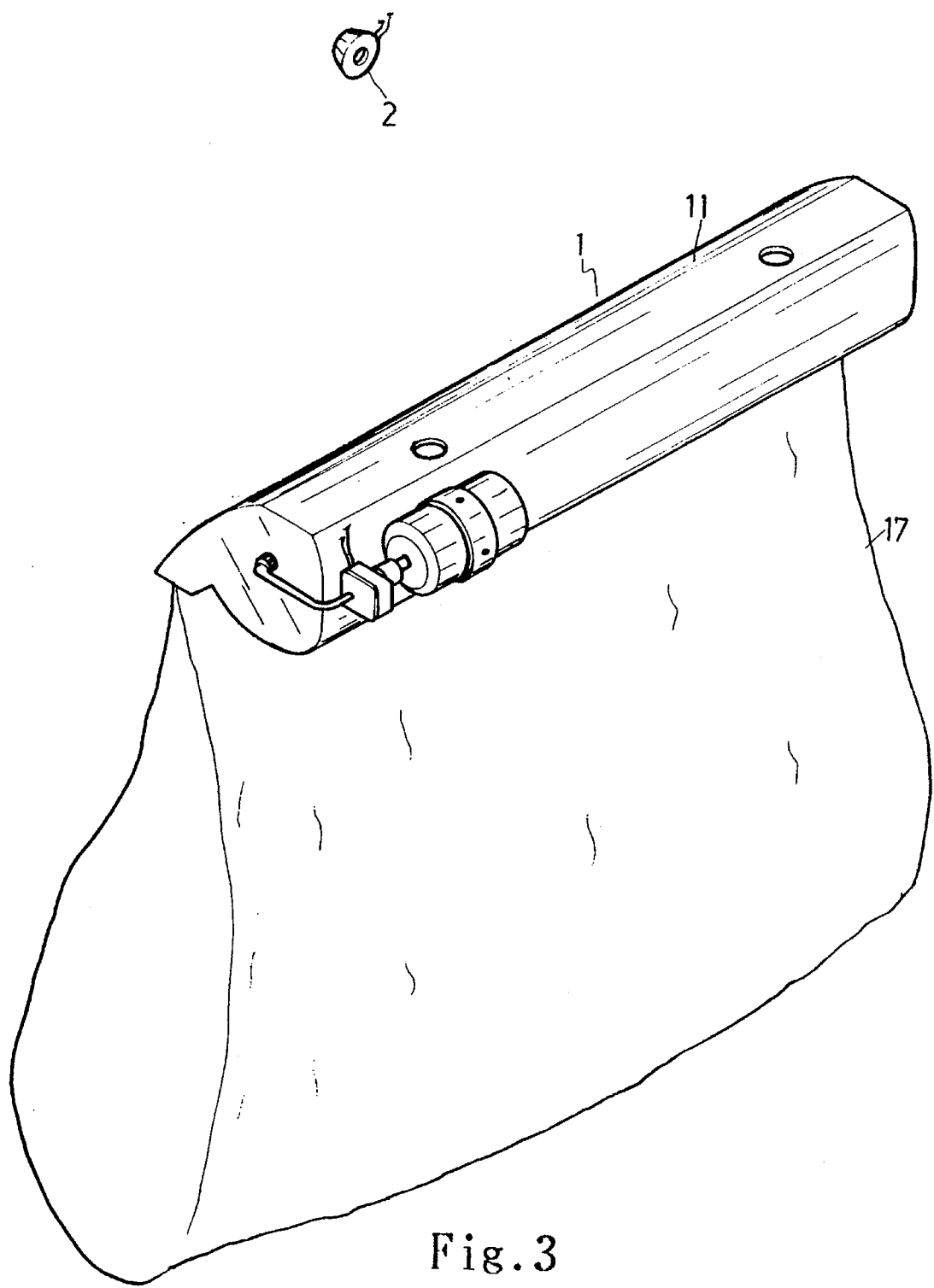
FIG. 3 is an elevational view of the air curtain device of the invention, showing the air curtain being inflated.
Figure 4:
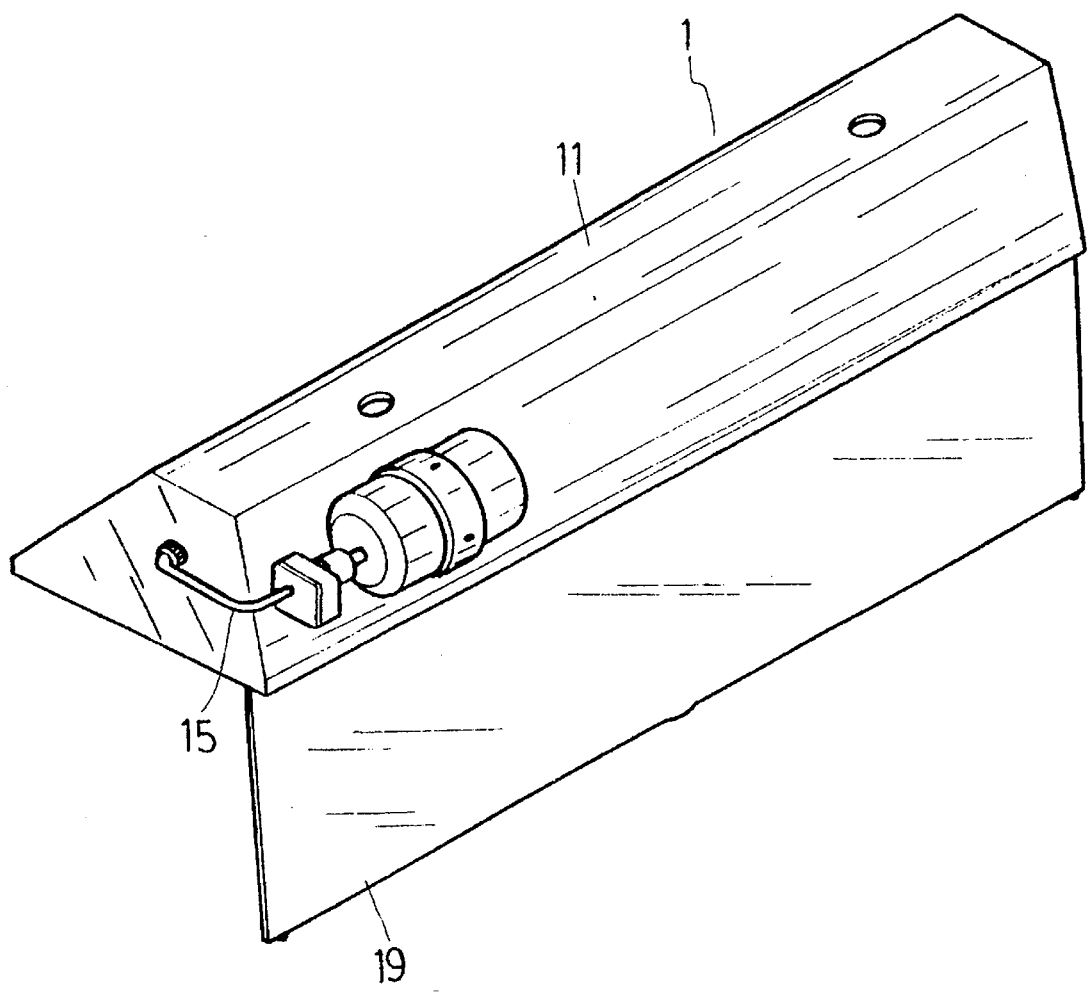
FIG. 4 is an elevational view of the air curtain device of the invention, showing a housing with a cover plate.

In the first case, as shown in FIG. 2, the housing 17 is internally provided with a shaft 16 which has a first pin 161 and a second pin 161 at the respective two ends thereof. The first pin 161 has a central opening 1611 connecting to a hollow interior of the shaft 16, in which air may be circulated. The air curtain 17 is attached to the shaft 16, and a hose 172 (not shown) is placed inside the air curtain 17 so that the air within the shaft 16 may flow into the air curtain 17 which is normally furled on the shaft 16.

Figure 5:
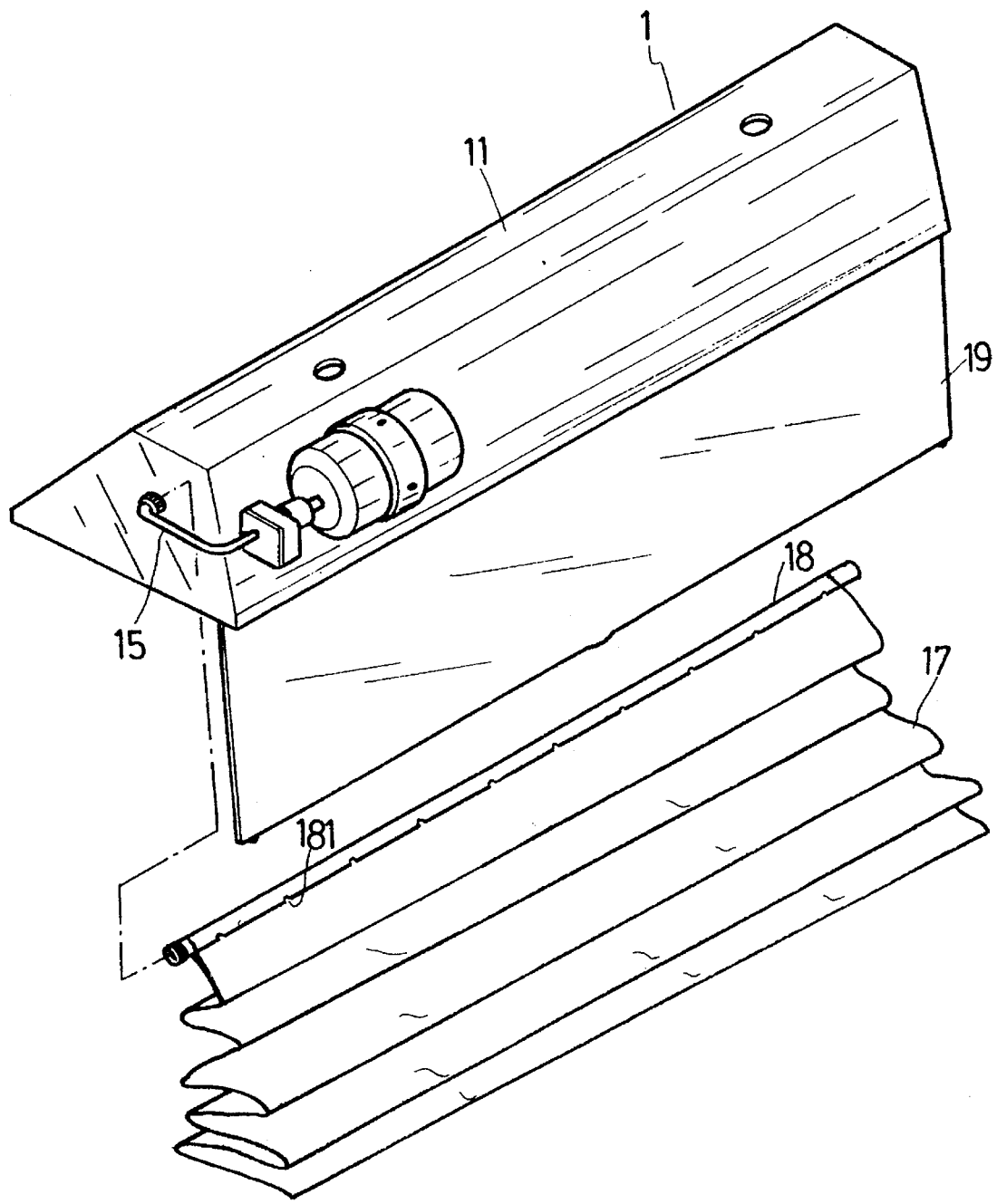
FIG. 5 is an elevational view of the air curtain device of the invention, showing the air curtain in a partly folded state.
Figure 6:
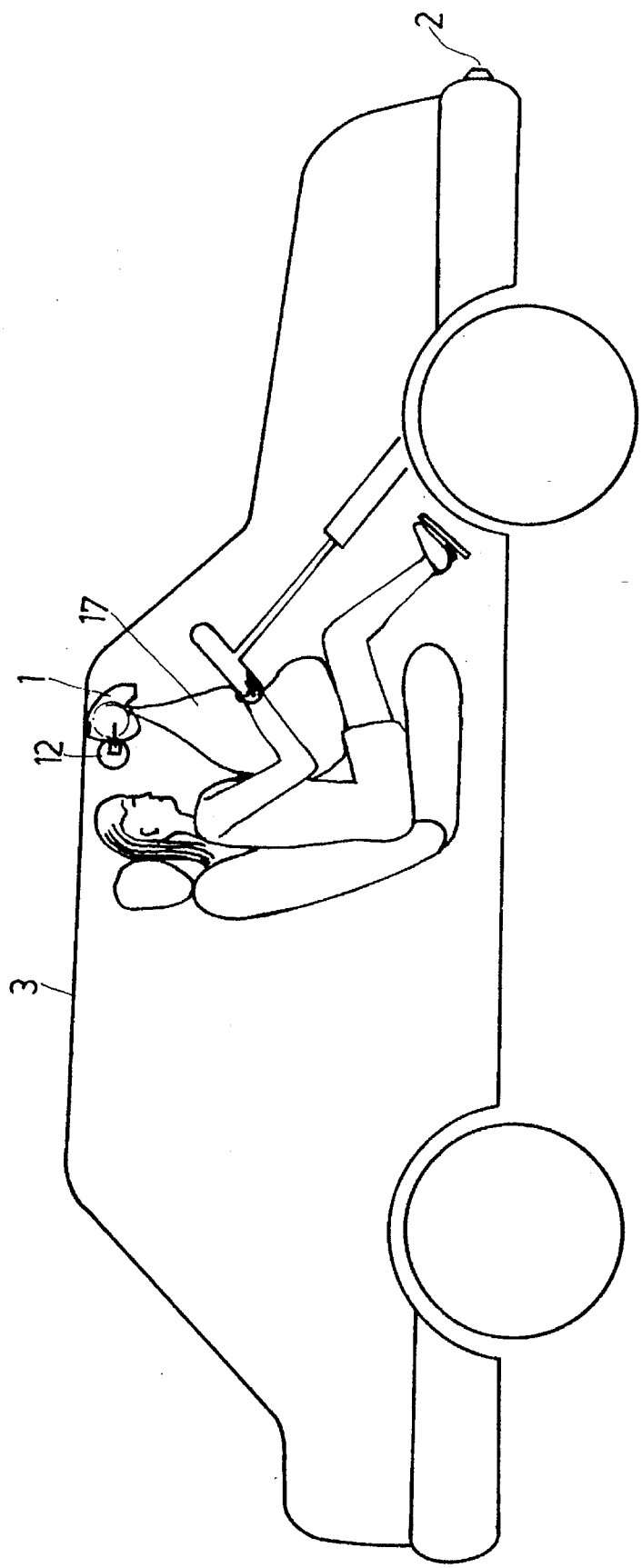
FIG. 6 is a schematic view use of the air curtain device of the invention in a car.

In the second case, with reference to FIG. 5, an air release tube 18 is disposed inside the housing 11. The air release tube 18 has a plurality of vents 181 thereon, which are spaced equally apart from each other. The air curtain 17 is folded up and placed inside the housing 11 and the air release tube 18 is disposed inside the air curtain 17 at an upper end thereof. Air may flow via the air release tube 18 to inflate the folded air curtain 17 so that the air curtain 17 swells downwardly to form a protective air curtain. The housing 11 is further provided with a cover plate 19 which will be pushed open by the air curtain 17 when inflation begins.

The air curtain device 1 may be mounted in the car in front and above the head of the driver or the passenger, while the infrared detecting device 2 may be installed at a suitable position at the farthest front end of the car. When the car is moving, the detecting device 2 may detect any car or object to which the car is approaching and may, via the circuit board 14, actuate the electromagnetic valve 13 on the air curtain device 1, so that high pressure compressed air flows speedily from the compressed-air cylinder 12 through the tubing 15 and the hose 171 or the air release tube 18 into the air curtain 17 which swells downwardly to form an air curtain to protect the driver or the passenger.

In the present invention, there is no need to replace the entire air curtain device after use. It is only necessary to change the compressed-air cylinder. Besides, the present invention may be adapted for use not only in cars and trucks but also in mass transportation means such as buses and trains, providing effective protection for drivers or passengers against accidental crashing, particularly against broken glass and parts.

Although the present invention has been illustrated and described with reference to the preferred embodiment thereof, it should be understood that it is in no way limited to the details of such embodiment but is capable of numerous modifications within the scope of the appended claims.

What is claimed is:

1. An inflatable safety air curtain device for vehicles comprising an air curtain device and an infrared detecting device, said air curtain device consisting of a housing for accommodating an air curtain, and a compressed-air cylinder containing high pressure compressed air, an electromagnetic valve and a circuit board mounted at a rear side of said housing, said compressed-air cylinder communicating with said air curtain via said electromagnetic valve and a tubing, said air curtain being provided with a transparent window at a suitable position thereof to prevent obstruction of a driver's vision, said air curtain device capable of being mounted in a car in front and above the driver or passenger, said housing further having a shaft disposed inside, said shaft having a first pin at one end thereof and a second pin at the other end thereof, said first pin being provided with a central opening which communicates with a hollow interior of said shaft in which compressed air may circulate, said air curtain being attached to said shaft with a hose disposed inside said air curtain for permitting compressed air within the hollow interior of said shaft to go into said air curtain, said air curtain being furled on said shaft under normal conditions, said infrared detecting device being mounted at a farthest front end of the car for detecting any car or object to which the car is approaching, said infrared detecting device capable of actuating said electromagnetic valve on said air curtain device via said circuit board upon detecting any car or object within a critical range, so that compressed air from said compressed-air cylinder flows instantly via said tubing through said hose into said air curtain which immediately swells downwardly to form a protective air curtain to protect the driver or the passenger.

2. An inflatable air curtain device for vehicles as claimed in claim 1, wherein said air curtain may be compressed and folded up and placed inside said housing, and said housing is further provided with an air release tube having thereon a plurality of vents spaced equally apart from each other, said air release tube being arranged at an upper end of said air curtain such that compressed air released from said compressed-air cylinder may enter said air curtain via said air release tube to inflate said air curtain, said housing being further provided with a cover plate which is pushed open by said air curtain when inflation begins.

3. An inflatable air curtain device for vehicles as claimed in claim 1, wherein, after compressed air has been released from said compressed-air cylinder to inflate said air curtain, there is no need to replace the entire inflatable air curtain device and it is necessary to replace said compressed-air cylinder only.

* * * * *